United States Patent
Tibor (10) Patent No.: US 7,231,068 B2
(45) Date of Patent: Jun. 12, 2007

(54) ELECTRONIC TRANSACTION VERIFICATION SYSTEM

(75) Inventor: Joan Tibor, Waycross, GA (US)

(73) Assignee: Solidus Networks, Inc., San Francisco, CA (US)

( * ) Notice: Subject to any disclaimer, the term of this patent is extended or adjusted under 35 U.S.C. 154(b) by 0 days.

(21) Appl. No.: 10/816,037

(22) Filed: Apr. 1, 2004

(65) Prior Publication Data

US 2004/0234117 A1 Nov. 25, 2004

Related U.S. Application Data

(63) Continuation-in-part of application No. 09/335,649, filed on Jun. 18, 1999, now Pat. No. 6,728,397.

(60) Provisional application No. 60/089,959, filed on Jun. 19, 1998.

(51) Int. Cl.
G06K 9/00 (2006.01)

(52) U.S. Cl. .................. 382/116; 382/127; 340/5.52

(58) Field of Classification Search ............ 382/115, 382/116, 119–127, 135–140, 179, 176, 182, 382/184, 193, 202, 231, 233, 248, 276, 287, 382/305, 314, 320, 168, 321; 705/75, 79, 705/45; 235/379, 380; 340/5.41, 5.8, 5.52; 902/3, 7

See application file for complete search history.

(56) References Cited

U.S. PATENT DOCUMENTS

| | | | | |
|---|---|---|---|---|
| 4,048,618 A | | 9/1977 | Hendry | 340/146.3 E |
| 4,109,238 A | * | 8/1978 | Creekmore | 340/5.8 |
| 4,187,498 A | * | 2/1980 | Creekmore | 340/5.8 |
| 4,213,038 A | | 7/1980 | Silverman et al. | 235/382 |
| 4,253,086 A | | 2/1981 | Szwarcbier | 340/146.3 E |
| 4,582,985 A | | 4/1986 | Löfberg | 235/380 |
| 4,672,377 A | * | 6/1987 | Murphy et al. | 340/5.41 |
| 4,947,443 A | | 8/1990 | Costello | 382/5 |
| 4,993,068 A | | 2/1991 | Piosenka et al. | 380/23 |
| 4,995,086 A | | 2/1991 | Lilley et al. | 382/4 |
| 5,180,901 A | | 1/1993 | Hiramatsu | 235/380 |
| 5,305,196 A | | 4/1994 | Deaton et al. | 364/401 |
| 5,321,765 A | | 6/1994 | Costello | 382/4 |
| 5,444,794 A | | 8/1995 | Uhland, Sr. | 705/45 |
| 5,484,988 A | | 1/1996 | Hills et al. | 235/379 |
| 5,594,226 A | * | 1/1997 | Steger | 235/379 |
| 5,598,474 A | | 1/1997 | Johnson | 380/23 |
| 5,613,012 A | * | 3/1997 | Hoffman et al. | 382/115 |
| 5,623,522 A | | 4/1997 | Ito | 375/369 |
| 5,668,874 A | | 9/1997 | Kristol et al. | 380/23 |
| 5,668,897 A | | 9/1997 | Stolfo | 382/283 |

(Continued)

*Primary Examiner*—Seyed Azarian
(74) *Attorney, Agent, or Firm*—Womble Carlyle Sandridge & Rice, PLLC (57) ABSTRACT

An electronic transaction verification system for use with transaction tokens that gathers and transmits information about the transaction token and biometric data. The electronic transaction verification system preferably digitizes various indicia of the token and transmits the transaction information data to a central system. The central system compares the transaction data with an existing database of information to determine if the customer at the point of the transaction is in fact authorized to use the account, and if the account is in satisfactory condition for approval of the transaction. The electronic verification system includes a biometric data device for recording and transmitting biometric data at the point of the transaction to a biometric database for comparison and identity verification in real time.

33 Claims, 6 Drawing Sheets

U.S. PATENT DOCUMENTS

| | | | | |
|---|---|---|---|---|
| 5,703,344 A | * | 12/1997 | Bezy et al. | 235/379 |
| 5,745,046 A | | 4/1998 | Itsumi et al. | 340/825.31 |
| 5,748,780 A | | 5/1998 | Stolfo | 382/232 |
| 5,764,789 A | | 6/1998 | Pare, Jr. et al. | 382/115 |
| 5,774,879 A | | 6/1998 | Custy et al. | 705/35 |
| 5,799,092 A | | 8/1998 | Krostol et al. | 380/51 |
| 5,802,199 A | | 9/1998 | Pare, Jr. et al. | 382/115 |
| 5,815,252 A | | 9/1998 | Price-Francis | 356/71 |
| 5,815,598 A | | 9/1998 | Hara et al. | 382/211 |
| 5,818,955 A | | 10/1998 | Smithies et al. | 382/115 |
| 5,832,464 A | * | 11/1998 | Houvener et al. | 705/45 |
| 5,852,670 A | | 12/1998 | Setlak et al. | 382/126 |
| 5,974,146 A | * | 10/1999 | Randle et al. | 705/77 |
| 6,032,137 A | * | 2/2000 | Ballard | 705/75 |
| 6,072,894 A | | 6/2000 | Payne | 382/118 |
| 6,091,835 A | | 7/2000 | Smithies et al. | 382/115 |
| 6,105,011 A | * | 8/2000 | Morrison, Jr. | 705/45 |
| 6,145,738 A | | 11/2000 | Stinson et al. | 235/379 |
| 6,390,362 B1 | | 5/2002 | Martin | 235/379 |
| 6,592,029 B2 | | 7/2003 | Brikho | 235/379 |
| 6,695,204 B1 | | 2/2004 | Stinson et al. | 235/379 |
| 2002/0113122 A1 | | 8/2002 | Brikho | 235/379 |
| 2004/0026500 A1 | | 2/2004 | Brikho | 235/379 |

\* cited by examiner

ELECTRONIC TRANSACTION VERIFICATION SYSTEM

CROSS-REFERENCE TO RELATED APPLICATION

This application is a continuation-in-part of U.S. patent application Ser. No. 09/335,649, filed Jun. 18, 1999 now U.S. Pat. No.6,728,397, which claims the benefit of U.S. Provisional Application No. 60/089,959 filed Jun. 19, 1998. This application incorporates the co-pending patent application by reference into this description as fully as if here represented in full.

FIELD OF THE INVENTION

The present invention generally relates to credit and identity verification systems. More particularly, the present invention relates to credit approval systems at the point of sale that utilize biometric data such as fingerprints, signatures, and/or other methods to ascertain if the identity of the person attempting to pay by use of a token, such as a negotiable instrument (e.g., a check), a credit card, a smart card, is an authorized person for that particular checking or credit account, and if that account is in order.

BACKGROUND OF THE INVENTION

There are devices known in the art that gather biometric data from persons for storage or for comparison with stored biometric data for purposes of identity verification. An example of storing biometric data for identity verification is U.S. Pat. No. 4,213,038 to Silverman, et al., for an access security system. Silverman, et al., discloses storing a fingerprint on a card, in either an actual print or "micropattern," and the card is read by a control means. The fingerprint recordation is ancillary to the preferred function of the card which is identification based upon solely the microperforation of the card, which is not directly related to the fingerprint.

Check funds verification systems are also known in the art that allow merchants and others to verify that customers have funds available in a specific checking account. U.S. Pat. No. 5,484,988 to Hills, et al., discloses a check-writing point of sale system that provides for remote verification of funds availability. Hills, et al., is particularly directed to the purchase of goods through an electronic funds transfer.

U.S. Pat. No. 4,253,086 to Szwarcbier discloses a process and apparatus for positive identification of customers that is particularly disclosed as using a fingerprint on a credit card and comparing the fingerprint of the customer to that on the card, and selectively, with a master print on file. Szwarcbier also discloses a printed fingerprint card.

There are "smart cards" known in the art which include fingerprint identification means, such as U.S. Pat. No. 4,995,086 to Lilley, et al., U.S. Pat. No. 4,582,985 to Löfberg, U.S. Pat. No. 4,993,068 to Piosenka, et al., and U.S. Pat. No. 5,180,901 to Hiramatsu. All of these references disclose smart cards that have, at least, a stored fingerprint in a local memory (such as magnetic tape or integrated circuit) that interacts with a reading means at the point of sale to assist in customer identification.

An example of an actual fingerprint sensor is U.S. Pat. No. 5,745,096 to Hsumi, et al., which is for a surface-shaped sensor identification device. The Hsumi, et al. device is focused on the specific element of sensing and recording the fingerprint, as opposed to a complete identity verification system.

There are various types of biometric measurements in common use today. The types of biometric measurements include fingerprint verification, hand geometry, voice recognition, retinal scanning, iris scanning, signature verification, and facial recognition. Each biometric device and system has its own operating methodology. The process for any given individual usually begins with an enrollment process. The system captures one or more samples of the biometric. The samples are stored in a "biometric template" (also referred to herein as a biometric database), and are used for future comparison during authentication. Once enrollment and storage are complete, users authenticate themselves by matching the template against current input ("live data"). Comparison of the live data and the template results in a simple binary yes/no match.

Fingerprint verification is a well-known type of biometric measurement. If properly implemented, fingerprints provide high accuracy and at relatively low cost. Hand geometry measures physical characteristics of the individual's hand and fingers and is most widely used in physical access control systems. Voice recognition remains difficult to implement. Despite recent advances in voice recognition technology, background noise, microphone quality, the common cold, and anxiety can alter the human voice enough to make voice recognition difficult, if not impossible. Voice recognition technologies include telephone authentication. Extraction and pattern matching algorithms embedded on computer chips are used to analyze voices. Retinal scanning is well established and highly accurate, however, it requires that the individual look directly into the retinal reader. Retinal scans shoot a low-intensity beam of light into the eye and record the pattern of veins in the eye. Iris scanning overcomes most of the problems of retinal scanners and does not require direct contact with the scanner, nor does it require the individual to remove eyeglasses. The technology works by scanning the unique random patterns of the iris. Unlike retinal vein patterns that can change over time, the iris is unique and does not change during a person's lifetime. Facial recognition systems measure characteristics such as the distance between facial features (e.g., pupil to pupil) or the dimensions of the features themselves (such as the width of the mouth). Neural network technology or statistical correlations of the facial geometric shapes are used with this kind of system. Signature verification is a relatively accurate system and is treated separately from the other forms of biometric systems described herein.

With fraudulent check losses alone reaching ten billion dollars annually, the banking industry is striving for ways to reduce these losses. Many proposals have been presented over the last five to ten years. One of the least sophisticated approaches is placing the individual's fingerprint on a sticker and attaching the sticker to the check being presented. Among the more sophisticated approaches is the use of smart cards that have a chip containing biometric information of the account holder. The biometric information stored on the chip can be compared with the biometric information of the person presenting the smart card at the transaction location. However, these alternative methods of reducing fraudulent activity are not meeting the needs of industry. The use of fingerprint stickers are a deterrent for the least sophisticated forger, but the process of identifying the fingerprint on a sticker can take a long time in crime labs due to their backlog and their obvious priority of processing fingerprints obtained from crime scenes in which felonies involving violence occurred. Smart cards with embedded biometric chips are used with credit cards or debit cards, but still do not prevent the more sophisticated identity thief. The more sophisticated identity thief steals account information and then produces his own credit card containing his own biometric information embedded in the chip. When the identity thief presents his biometric information at the transaction location, the verification is being made against an already faulty biometric sample stored on the chip.

SUMMARY OF THE INVENTION

The present invention, in its simplest form, combines the use of valid biometric samples obtained from authentic identifications (IDs) with biometric samples provided by a person at a transaction location, thereby verifying that the biometric information presented for a transaction is a valid biometric for a particular person. In addition, the ID and the biometric sample can also be checked against known invalid users. Although it is possible for someone to counterfeit what is believed to be the authentic ID, in such cases, the identity thief provides an actual fingerprint that has been taken and placed on the token or on the transaction slip. When the token is returned to the transaction location as forged, counterfeit, stolen, etc., the fingerprint is entered into the database of known invalid users, thus preventing any further identity theft activity by this person on the verification system. The present invention, in its most complex form, adds additional safeguards, such as verifying the ID with information from the state. This ensures that an ID has not been altered, and is in fact an authentic state-issued ID (e.g., driver's license). Another such safeguard is verifying the information at the processing center of the token with the original information that a bank or token company obtained at the creation of the bank or token account.

The present invention, in one exemplary embodiment thereof, comprises a verification system for check/negotiable instruments or other form of tokens, which has the ability to scan the information from negotiable instruments such as the magnetic ink character recognition (MICR) line, and gather biometric data such as fingerprints. The system alternately scans driver's licenses or other identification cards, and obtains and transmits a signature of a customer, preferably all occurring at a transaction location (e.g., point of sale) for purposes of identity and fund verification. However, the electronic transaction can occur at places other than a point of sale. For example, the electronic transaction can occur over the Internet, as part of an Internet-based transaction and include transmission of biometric data or signatures for user verification. Therefore, in general, transaction location refers to the place where the user or customer enters his information, such as account data or biometric data into the electronic transaction verification system. The verification system preferably digitizes various indicia of the check, the preferred indicia being the magnetic ink (MICR line) on the check, tendered by the customer at the transaction location, and transmits the data to a negotiable instrument information database, through a communications medium, whereby the inputted data is compared with an existing database of information to determine if the customer at the point of sale is in fact authorized to use the account, and if the account is in satisfactory condition for check approval. The communications medium can be a broadband connection, a dial-up connection, a direct communications link, a satellite link, or fiber optic cable or any other communication link that allows communications between a transaction location and a central or local database.

In this exemplary embodiment, the verification system alternatively includes a device and method for recording and/or transmitting a biometric measurement of the customer at the location of the transaction and, in the case of a fingerprint biometric, printing the fingerprint on the negotiable instrument, either in actual or digitally encoded form, such that the fingerprint can be later checked against a biometric database of existing fingerprints at such time as the instrument is processed at a bank, which provides an added means of security in the event that fraudulent activity has been discovered between the time of receiving the token at the transaction location and the time it is presented at the processing center. If the system includes a device for scanning an information card that contains biometric data, such as a proper fingerprint printed on a driver's license, and/or signature, then the fingerprint and signature of the user can alternatively be compared to the recorded data on the card, in addition to or instead of, transmission of the various databases.

In an alternate embodiment of the verification system, a negotiable instrument or other token is swiped and the fingerprint is simultaneously taken and digitized whereby the combined data is transmitted to a central (or local) system that includes an account information database and a biometric database, and the transmitted data is compared with identification data already on file, and the central (or local) system determines if the identification data of an authorized user on file matches with the transmitted data from the user at the transaction location. Local system, in the present context refers to a system that is in physical proximity to the transaction location (e.g., same store). The system then returns the results of the decision on approval to the transaction location. A device at the transaction location displays the decision data and/or prints out a hard copy indicating whether the negotiable instrument/token was approved or denied.

As is well known in the banking industry, the MICR line on a check includes the bank routing number, account number, check number, check amount, and other information, that can be printed near the bottom of the check in magnetic ink in accordance with generally applicable industry standards. In operation, the central (or local) system receives data from the transaction location and then determines if the "ABA" magnetic number on the MICR line of the check is a valid number, if the fingerprint data is that of an account owner authorized to use that account, and/or if the signature is that of the authorized account owner, whereby any negative response to these decisions preferably causes return of the data indicative of the negative response to the transaction location. Upon affirmative indications in the decisions, the central (or local) system retrieves the frequency of the account accesses to determine if the current requested access is in excess of a pre-determined limit of an allowable number of accesses. If the current access is in excess of the pre-determined allowable limit, then the data is returned to the transaction location indicating the unacceptable request to exceed the limit, and thus, disapproval of the transaction. If the current access is not in excess of the allowable determined limit, then the verification of the check is approved and such verification is used to update the frequency of account access database, and the approval is returned to the transaction location. Various account conditions can be used, alternatively, to verify the condition of an account. Such conditions include "outstanding checks," "returned checks," and "account closed" among others. For example, if there are outstanding checks on the system for a user's account, then the present invention can return an indication to the transaction location that the user's account is not in condition to satisfy the negotiable instrument.

The verification system preferably includes the capability to provide reports on user/customer activity to a merchant or business upon request. The merchant directs an inquiry to the central (or local) system which is in communication with a series of databases and which preferably includes databases indicative of: a number of transactions for a specific account; the location of the transactions for such account; and a user/customer list and relevant data associated with the user/customer. Depending upon the inquiry generated from the merchant, the main (or local) system retrieves the requested information to generate a report on a specific customer, and then returns the report to the merchant.

Alternatively, the verification system can be used in conjunction with a bank proofing machine during batch processing of checks. When the proofing machine scans the magnetic number from the check, the identification data imprinted on a check at the transaction location is compared with account owner identification data as recorded and maintained by the bank to determine if the correct account owner submitted the check. The verification system can also be used in conjunction with an Electronic Check Exchange (ECE) system in which the check information is exchanged electronically, in lieu of or in addition to the exchange of paper checks. For forward presentment, an ECE system is usually referred to as an Electronic Check Presentment (ECP) system. The verification system also can be used in conjunction with a token processing system such as a credit card or debit card processing center to verify the information read from the magnetic strip on the token with information recorded and maintained by the credit or debit card processing center.

Accordingly, the present invention has a practical application in that it provides an electronic transaction verification system to a merchant for use at a transaction location, which determines if the user/customer is authorized to use a specific account, and if the account is in satisfactory condition to remit funds for the negotiable instrument drawn against it.

The present invention of the electronic transaction verification system further has industrial applicability in that it provides a computer system which correlates biometric data that is precise with not easily forgeable measurements of a customer, such as fingerprints and/or data from identification cards, and that can be digitally encoded and processed along with the information relative to a negotiable instrument such that the risk of the merchant accepting a bad instrument is greatly reduced. Thus, the present invention can be quite economically beneficial to a merchant utilizing the system.

More generally, the invention is applicable to electronic transaction verification of a person initiating a transaction with a token at a transaction location. In the context of the invention, a transaction token can be a negotiable instrument, a check payable on demand, a substitute check, a traveler's check, a debit card, a credit card, a smart card, a promissory note, or food stamps. The token is presented at a transaction location to a vendor or merchant. The transaction is initiated by the user presenting a token at the transaction location along with a biometric measurement being taken to verify the identity of the individual against information stored in a database. Information read electronically from the token is used to determine the condition of a user account.

A substitute check, as used herein, has the meaning given to it in the "Check Clearing for the 21$^{st}$ Century Act," Public Law 108-100, Oct. 28, 2003. A substitute check is a legal equivalent of the original check that has been truncated. It contains an image of the front and back of the original check and bears a MICR line containing all information appearing on the MICR line of the original check.

BRIEF DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

Figure 1:
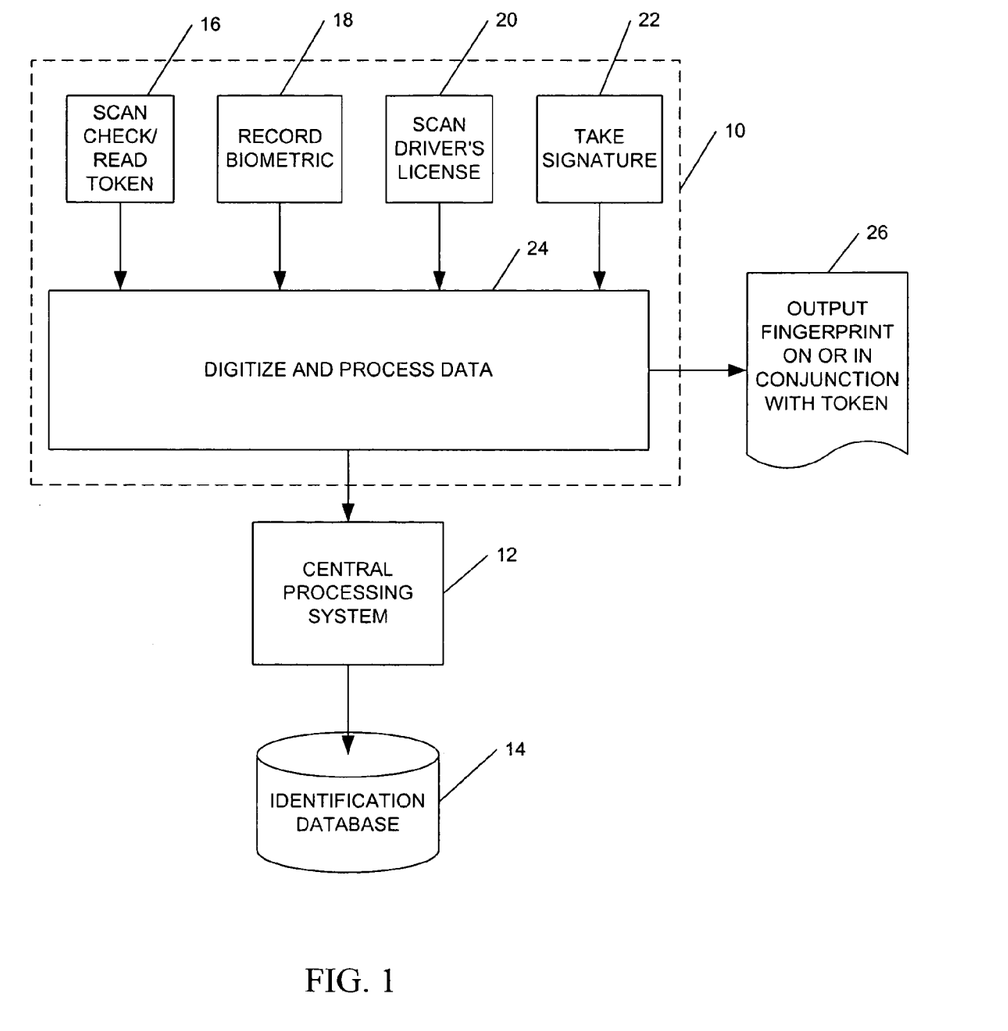
FIG. 1 is a block diagram of an exemplary embodiment of the electronic transaction verification system illustrating a verification unit in communication with a central system and identification database.

Referring now in greater detail to the drawings, in which like numerals represent like components throughout the several views, FIG. 1 illustrates a block diagram of an exemplary embodiment of the verification system illustrating an electronic transaction verification unit 10 in communication with a central processing system 12 that includes an identification database 14. The identification database can include a number of databases used in the identification process such as a biometric database of known customer data, as well as a separate database of known invalid users. The database of known invalid users can be established by correlating a biometric presented at a transaction location that is used with a fraudulently obtained transaction token, and storing the biometric as invalid. Central processing system 12 can be a main system remote from the transaction location. While a check is disclosed as one type of token to be processed in an exemplary embodiment of the present inventive system, other tokens can be processed in the same manner as disclosed herein. Negotiable instrument, as the term is used herein is defined in Article 3 §104 of the Uniform Commercial Code. An instrument is negotiable if it is: (1) a written instrument signed by the endorser or maker; (2) an unconditional promise to pay a certain amount of money, either on demand or at a future date; and (3) payable to the holder or bearer. Examples of negotiable instruments are checks, bills of exchange, and promissory notes. A check as used herein means a draft, payable on demand and drawn on a bank, or a cashier or teller's check. This is the customary definition of a check. The exemplary embodiment of the electronic transaction verification unit 10 is comprised of, at least, a check scanner or token reader 16 and a biometric data-gathering device 18, such as a fingerprint recording device.

Many check scanning devices are known in the art that scan the magnetic ink on the bottom of checks and such devices range in use from point-of-sale devices to scanners used at banks, where the more advanced devices are referred to as bank "proofing" machines. However, such device alternately includes the capability of video digitization of the check or gathering of other characteristics of the check that are useful for comparison.

The biometric recording device 18 preferably digitizes the fingerprint of a customer at the point of sale for transmission to a remote biometric database. Many devices for digitization and transmission of fingerprints are well known in the art, such as the devices of digital biometrics. Other biometric devices such as retinal scanners and voiceprints are alternately used with, or in lieu of, the exemplary fingerprint scanner. Such biometric devices are commercially available and adaptable for use with the invention. The electronic transaction verification unit 10 also preferably includes a card reader/scanner, such as a driver's license scanner 20 which scans information from a driver's license, which is especially useful in states that put information, such as fingerprints, in a computer-readable medium such as a magnetic strip (e.g., a California license) or a bar code (e.g., a Georgia license) on the driver's license. When the license contains this information, the electronic transaction verification unit 10 can perform an initial comparison between the biometric recorder device 18 and the device's license scanner 20 for determination of the user's/customer's identity, in addition to or instead of, transmitting biometric data to the biometric database of the central processing system 12. The information gathered from the license scanner 20 can also be verified with information licensed from a state division of motor vehicles in order to authenticate a driver's license. Finally, the electronic transaction verification unit 10 preferably includes a signature taking device 22 that allows a customer to write his or her signature on the device that then encodes the signature into digital format for transmission. Such transmissions can occur with or separately from the transmission of the check identification and biometric data. There are many devices known in the art that allow a signature to be digitized for storage and comparison, and any of such devices will work satisfactorily in the present inventive system.

The electronic transaction verification unit 10 is preferably a computer platform which has the capability to receive, digitize and process the incoming data from the devices, shown by block 24, for transmission to a central system 12. The central system 12 can be remotely located from the electronic transaction stations or can be at the same location as the electronic transaction station, e.g., an in-store central processor and database connected to electronic transaction stations by a local area network. The other devices can be integrated with the computer platform of the electronic transaction verification unit 10, however, the devices can also be independent from the computer platform as long as they are in connection to the electronic transaction verification unit 10 sufficient to transmit and have received by the unit 10 the relevant data from the devices. The central processing system 12 is in connection with, at least, an identification database 14 which at a minimum contains the relevant specific identification data related to various checking and/or credit accounts. The identification database 14 can be a hard drive on the central processing system 12, computer platform, or other type of memory device located either locally or remotely, but in connection with, the central system 12. Thus, in its most basic form, the present invention solely generates and records identification data of the customer relevant to a single sale and acceptance of a token at a transaction location through recordation of the specific token identification and biometric data of the customer at the transaction location, which is then transmitted by the various devices of the electronic transaction verification unit 10 for recordation. When the simple recordation of the event is effected, it is preferable that the electronic transaction verification unit 10 output a fingerprint (or other biometric data) for inputting on the specific check, negotiable instrument, or in conjunction with another type of token at the transaction location, shown by output 26, either in actual or digitally encoded form, whereby this identifying characteristic of the person cashing or tendering the check is contained upon the check itself and banks processing the check have the capability to compare that imprinted fingerprint with fingerprints on file for the actual account holders, if necessary. However, the printing of the fingerprint on the check or in conjunction with the token (e.g., credit card receipt) can be alternately used in any embodiment of the present inventive verification system.

Figure 2:
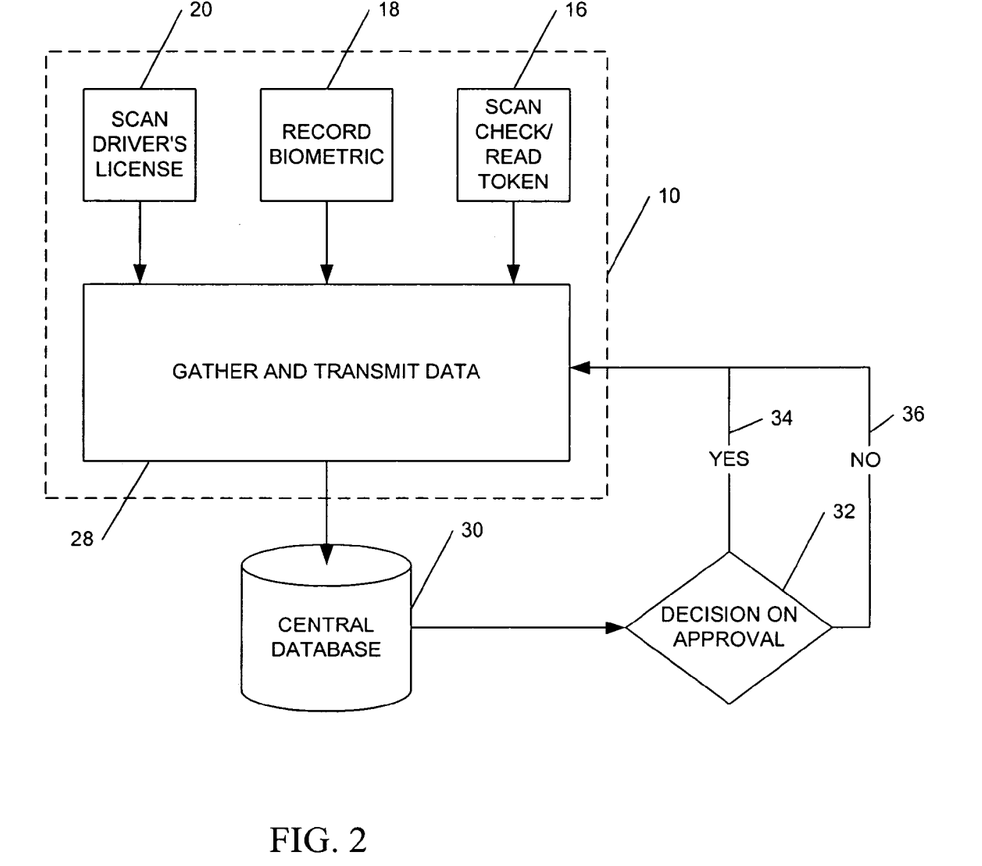
FIG. 2 is a block diagram illustrating an alternate embodiment of the present invention whereby the electronic transaction verification unit is in communication with a central database that returns an approval decision to the electronic transaction verification unit.

FIG. 2 illustrates an alternative embodiment of the electronic transaction verification unit 10 in communication with a central database 30 such that the central database 30 allows the data stream of the electronic transaction verification unit 10 to be acted upon by decision block 32 to determine if the token verification is approved or denied, and then returns the approval decision to the electronic transaction verification unit 10. In such embodiment, the computer platform receives, processes, and transmits the data of the various devices, shown by logic block 28, to the identification database included in the central database 30, via a communications link, for a simple comparison step to determine approval. The central database 30 includes a customer account information database (i.e., transaction information database), a biometric database of known customer biometric data, as well as a separate database of known invalid users. The database of known invalid users can be established by correlating a biometric presented at a transaction location with a fraudulently obtained transaction token and storing the biometric as invalid.

At the central database 30, the incoming data is compared, either in parallel with or separately with token identification data, with the existing known data for authorized users of accounts, shown by decision block 32, and an approval is made as to whether or not to accept the token. Either a yes decision 34 or a no decision 36 on approval is then retransmitted back to the computer hardware platform 28 of the check verification unit 10. While the check verification unit 10 is shown in communication with a database 30 remotely located thereto, it is not necessary that the central system 12 or the database 30 be located remotely to the electronic transaction verification unit 10. In fact, the electronic transaction verification unit 10 and central system 12 can be self-contained at the transaction location whereby the central database, or the account information and biometric databases are continually updated within the electronic transaction verification unit 10 through either a data connection to a master database or through periodic manual updates from storage media such as floppy disks or CD ROMs. In such an embodiment, the electronic transaction verification system is preferably self-contained and includes all the necessary devices for scanning drivers' licenses 20, gathering biometric data (e.g., fingerprints) 18, or scanning checks/reading tokens 16 (gathering check or token information data) within one unit comprising the system.

Figure 3:
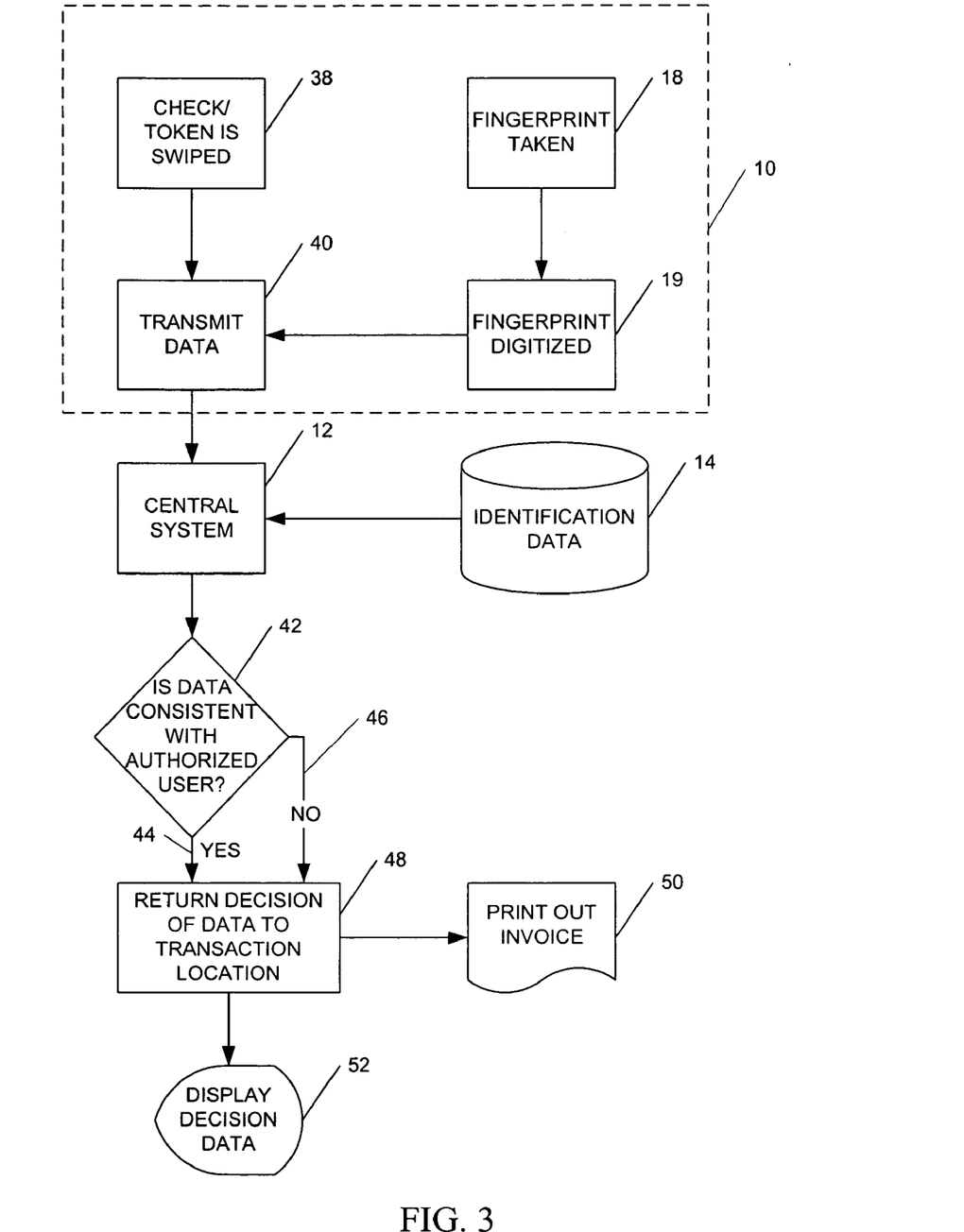
FIG. 3 is a flow chart of an alternate embodiment of the verification system illustrating the electronic transaction verification unit transmitting the identifying data of a check and a fingerprint to the central system for processing.

FIG. 3 is a flow chart of an exemplary embodiment of the processing logic of the electronic transaction verification system showing the electronic transaction verification unit 10 where a check or token is swiped, shown by logic block 38, and a fingerprint is taken, shown by logic block 18, with the fingerprint then being digitized, shown by logic block 19. Both the check information data and the biometric fingerprint data are unified at the transmitting data platform, shown by logic block 40, for parallel transmission. The transmitted data then reaches the central system 12 that is in communication with a check or token account and biometric identification database 14 such that a decision is made within the central system 12 in regard to check or token approval. As discussed previously, the identification database 14 can include a plurality of databases used in the identification process. One of these is the biometric database of known customer data. An additional biometric database of known invalid users can also be established. The identification database 14 collectively refers to the one or more biometric databases. The central system 12 performs a decision determining if the check/token information and biometric data are consistent with an authorized user for the account against which the check is drafted or token is provided, shown by decision block 42, whereby a yes decision 44 or a no decision 46 is returned to the transaction location, shown by logic block 48. Upon return of the data from the central system 12, the data indicative of the decision is displayed, shown by display block 52, and/or a hard copy is printed out, shown by document block 50, indicative of the decision made, and alternatively, the grounds for acceptance or rejection.

Figure 4:
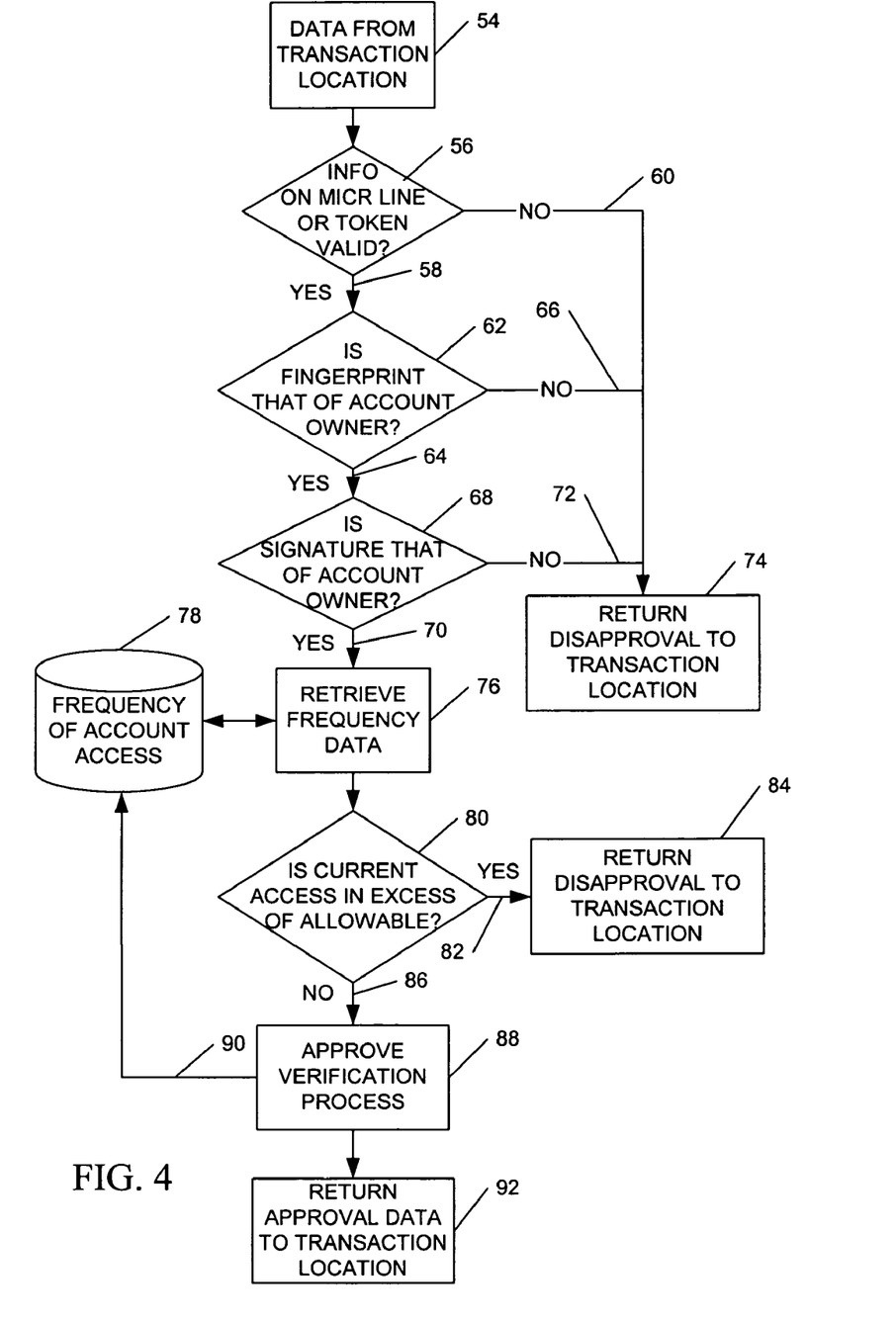
FIG. 4 is a flow chart illustrating the processing of transmitted data by the central system upon receipt of the data from the electronic transaction verification unit at the transaction location.

The present invention accordingly utilizes an inventive digital process whereby a dataset originates from the transaction location from the electronic transaction verification unit 10, shown by logic block 54, and is preferably processed on the central system 12 as shown in the processing logic flow chart of FIG. 4. A decision is made as to whether information on the MICR line (e.g., "ABA" number) or on the token is valid, shown by decision block 56, and then a decision is made as to whether the fingerprint (biometric data) is that of the registered account owner, shown by decision block 62, and then a decision is made as to whether the signature presented is that of the account owner, shown by decision block 68. Affirmative responses to these decisions, shown by yes arrows 58, 64, and 70, preferably allow further processing of the data, and no decisions shown by arrows 60, 66, and 72, preferably effect a return of data to the transaction location indicative that the transaction is disapproved, shown by block 74.

Once affirmative responses have been received to decisions 56, 62, and 68, then the data is further processed by accessing a frequency of access database 78 which has information on accounts based upon the numbers of inquiries to the system for a specific account, shown by logic block 76, and such information is maintained and updated in the frequency of account access database, shown by database 78, which can be either integrated with or remote to the central system 12. Then a decision is made as to whether the current access is in excess of a predetermined allowable amount of access inquires to the system for a specific account, shown by decision block 80, and if the current access is in excess of the allowable pre-determined amount, shown by yes arrow 82, then the data is returned to the transaction location indicative that the requested access exceeds the allowable amount, shown by logic block 84, and thus that the transaction is disapproved. Otherwise, if the current access is not in excess of the allowable pre-determined amount, shown by no arrow 86, then the electronic transaction verification request is approved, shown by logic block 88. Other measures can also be used in lieu of, or in addition, to these steps, to verify the condition of the account.

Upon approval, the information regarding approval is transmitted, shown by arrow 90, to the frequency of account access database 78 for updating of the records contained therein. The information regarding the approval of the electronic transaction is then returned to the transaction location and electronic transaction verification unit 10, shown by logic block 92.

The steps of the processes set forth in FIG. 4 are preferably performed by software being executed on the computer platform comprising the central system 12, located either at the transaction location and integrated with the electronic transaction verification unit 10, or located remotely thereto. One of skill in the art of computer programming can determine from the present disclosure and the flow charts disclosed herein the objects sufficient to write a program for the computer platform sufficient to perform the tasks as disclosed herein.

Figure 5:
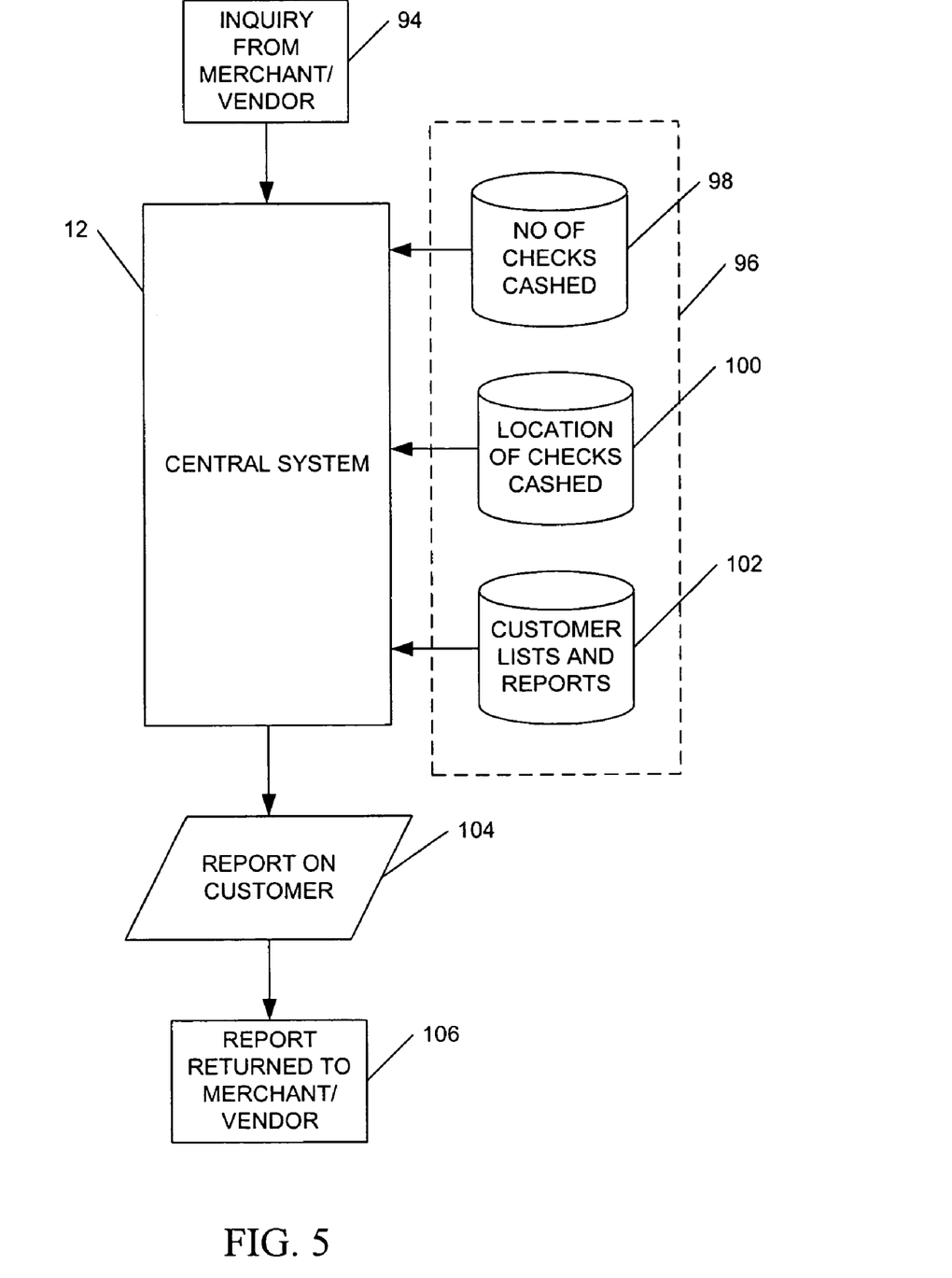
FIG. 5 is a block diagram illustrating the main system generating a customer report based upon receipt of an inquiry from a retailer.

The present invention of the electronic transaction verification system preferably includes the capability to return a report to a merchant/vendor upon request, as shown in FIG. 5. As so embodied, an inquiry and/or request is made from a merchant directed towards the central system 12, shown by logic block 94, which requests a specific report or series of reports. The central system 12 preferably includes access to a variety of databases 96, which preferably contains separate databases including a database indicative of a number of checks cashed for a given account, shown by database 98, locations of checks cashed for a specific account, shown by database 100, and a database containing various information regarding the customers of the account, shown by database 102. The central system 12 selectively accesses and interacts with these databases in response to the inquiry from the merchant at logic block 94, and generates a report on the specific customer or customers, shown by processed data logic block 104. The processed data then is returned in report form to the specific merchant, shown by logic block 106, which made the inquiry and request to generate the report. Such information generated by the verification system can prove highly informative as to customer trends such as drops in frequencies of purchases, customer dissatisfaction, or other trends that can then be effectively targeted by marketing efforts.

Figure 6:
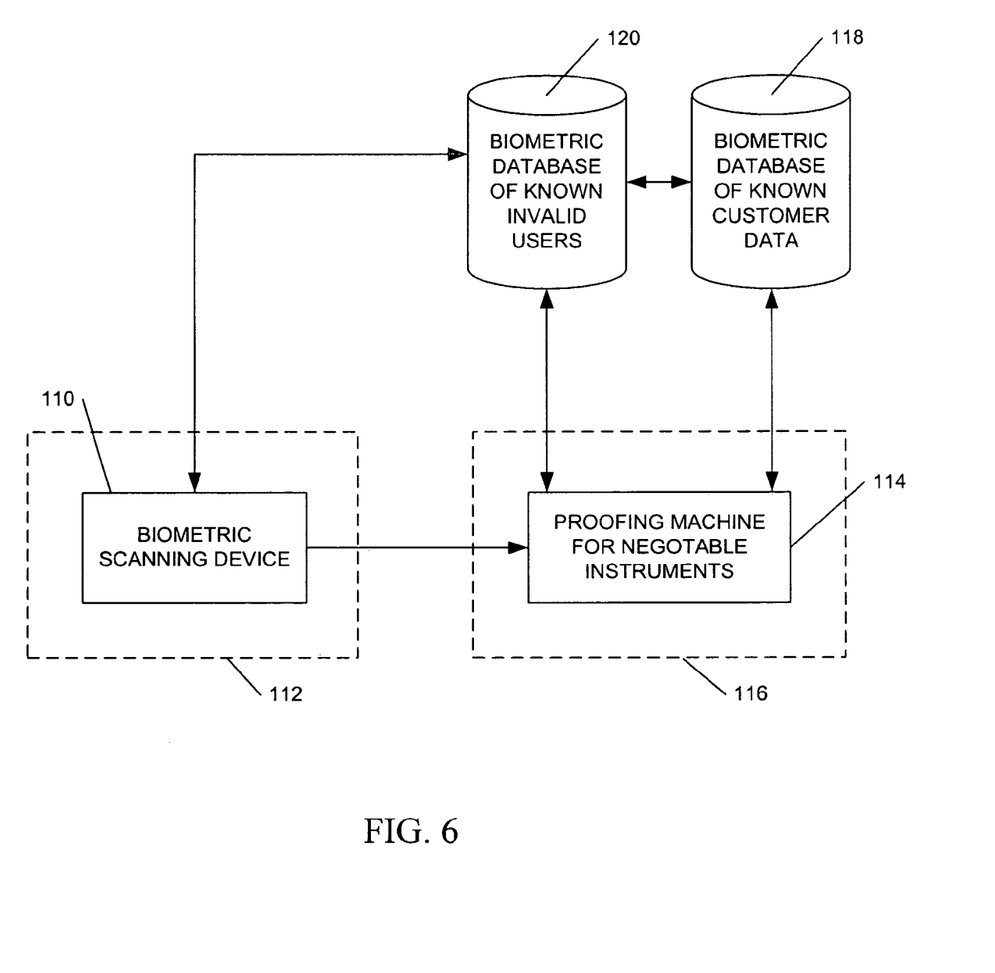
FIG. 6 is a block diagram illustrating a proofing machine interacting with the biometric data scanner at the transaction location, with the interrelation of a first biometric database for known customers and a second biometric database for known invalid data.

The present inventive verification system further provides that after the biometric identification data, such as a fingerprint, has been imprinted on the check, the present invention can alternately be used at a bank in conjunction with the proofing machine to determine if the biometric identification data on the check is that of the account owner. As shown in FIG. 6, the biometric data from the biometric scanning device 110, preferably at the transaction location 112, is sent, either electronically or physically, to the proofing machines for checks or negotiable instruments 114, typically at a bank processing center 116. In the past, checks were typically sent physically to a bank or processing center and the magnetic line of the check physically scanned by the proofing machine 114. Currently, many checks are being truncated electronically and the information contained therein is being processed directly or indirectly by host computers at the bank or processing centers.

In the embodiment shown in FIG. 6, the biometric data is printed on the check by the biometric scanning device 110 and the printed biometric data is scanned, and thus gathered, in addition to the magnetic numbers of the check. A comparison step preferably occurs within the proofing machine 114 during the batch processing and scanning of the magnetic numbers of the checks for transfer of funds from the accounts. The biometric data is retrieved and updated from a first biometric database 118 that contains the biometric data for known customers having accounts. The proofing machine 114 also preferably perform a comparison step with a second biometric database 120 containing biometric data for known invalid users who have perpetrated, or attempted to perpetrate, fraudulent activity with regard to tendering checks/negotiable instruments. Databases 118 and 120 can reside on the proofing machine 114, or can be located remotely. Such information in biometric database 120 is preferably also accessible by the biometric scanning device 110 at the transaction location 112 for updating and comparing, either separately from or in conjunction with, the proofing machine 114. If the check/negotiable instrument being compared was tendered fraudulently, the biometric database 120 is useful for determining the perpetrator's actual identity, and comparison between databases 118 and 120 can also be made for identity determination. In that regard, biometric database 120 is also accessible by central system 12, identification database 14, central database 30, as well as electronic transaction verification unit 10 for detection of known fraudulent users.

The present invention can be utilized in a variety of forms with a variety of sources of information other than those described in detail herein. As an example, the electronic transaction verification system can be interfaced to various transaction and identification information databases containing customer account information and biometric information.

While there have been shown a preferred and alternate embodiments of the present invention, it is to be understood that the invention may be embodied otherwise than is herein specifically shown and described, and that within the embodiments, certain changes may be made in the form and arrangement of the parts without departing from the underlying ideas or principles of the present invention of an electronic transaction verification system set forth in the claims appended herewith.

What is claimed is:

1. An electronic transaction verification system for use at a location where a transaction token is presented by an individual to complete a transaction comprising:
   a transaction information database for storing an account information for an authorized user;
   a first biometric database for storing biometric data for the authorized user;
   a second biometric database for storing biometric data for a plurality of invalid users;
   a reading device for reading the transaction token and transmitting transaction information data to the transaction information database;
   a biometric data device for scanning and transmitting biometric data obtained with the transaction information data to the first biometric database;
   wherein the biometric data device selectively transmits biometric data to the first biometric database for comparison with the biometric data stored for the authorized user to verify the identity of the individual presenting the transaction token in real time;
   wherein the biometric data is transmitted to the second biometric database to determine if the individual presenting the transaction token is an invalid user;
   wherein the reading device selectively transmits transaction information data to the transaction information database for comparison with account information stored for the authorized user to verify a condition of the account to complete the transaction in real time; and
   wherein a result from the comparisons with stored account information and stored biometric data for the authorized user is returned to the transaction location to accept or reject the transaction in real time.

2. The system of claim 1 further comprising:
   a signature scanning device for scanning signature data received with the transaction information;
   a signature database for storing signature data for the authorized user; and
   wherein the signature scanning device selectively transmits signature data to the signature database for comparison with the signature stored for the authorized user in real time.

3. The system of claim 1 wherein the transaction token comprises at least one of a check, a substitute check, a credit card, a debit card, a smart card, a promissory note, travelers check, and a food stamp.

4. The system of claim 1 wherein the biometric data is any one of a fingerprint scan, retinal scan, an iris scan, a voice print, a hand geometry scan, or a facial scan.

5. The system of claim 3 wherein the transaction information data includes data written in magnetic ink on the check.

6. The system of claim 3 wherein the transaction information data includes data encoded on the transaction token.

7. The system of claim 1 wherein the electronic transaction verification system selectively returns a report on customer usages.

8. The system of claim 1 wherein the biometric data device further selectively encodes recorded biometric data on the transaction token.

9. The system of claim 8 wherein the recorded biometric data is any one of a fingerprint scan, a retinal scan, an iris scan, a voice print, a hand geometry or a facial scan.

10. The system of claim 1 wherein the reading device and the biometric data device are located remotely from the biometric database and the transaction information database.

11. The system of claim 1 wherein the reading device and the biometric data device are located in proximity to the biometric database and the transaction information database.

12. An electronic transaction verification system for use at a location where a transaction token is presented by an individual to complete a transaction, comprising:

a transaction information database for storing an account information for an authorized user;

a first biometric database for storing biometric data for the authorized user;

reading means for reading the transaction token and transmitting transaction information data to the transaction information database;

biometric data means for recording and transmitting biometric data received with the transaction information data to the first biometric database;

a second biometric database for storing biometric data for a plurality of invalid users;

wherein the reading means selectively transmits transaction information data to the transaction information database for comparison with account information for the authorized user to verify that the individual presenting the transaction token is the authorized user and to verify a condition of the account to complete the transaction in real time;

wherein the biometric data means selectively transmits biometric data to the first biometric database for comparison with the biometric data stored for the user to verify the identity of the individual presenting the transaction token in real time;

wherein the biometric data is transmitted to the second biometric database to determine if the individual presenting the transaction token is an invalid user; and wherein a result from the comparisons with stored account information and stored biometric data for the authorized user is returned to the transaction location to accept or reject the transaction in real time.

13. The system of claim 12 further including:

signature scanning means for scanning signature data received with the transaction information;

a signature database for storing signature data for the authorized user; and wherein the signature scanning means selectively transmits signature data to the signature database for comparison with the signature stored for the authorized user in real time.

14. The system of claim 12 wherein the transaction token comprises at least one of a check, a substitute check, a credit card, a debit card, a smart card, a promissory note, a travelers check and a food stamp.

15. The system of claim 14 wherein the transaction information data includes data written in magnetic ink on the check.

16. The system of claim 14 wherein the transaction information data includes data encoded on the transaction token.

17. The system of claim 12 further including report means for transmitting a report detailing customer usage of the electronic transaction verification system.

18. The system of claim 12 further including means for selectively encoding the biometric data from the biometric data means in a readable medium on the transaction token.

19. The system of claim 12 wherein the biometric data is any one of a fingerprint scan, a retinal scan, an iris scan, a voice print, a hand geometry scan, or a facial scan.

20. A method of verifying the identity of a person attempting to tender a transaction token to complete a transaction, and the condition of an account against which the transaction token is applied, the method comprising the steps of:

obtaining transaction information from the transaction token;

obtaining biometric data from the person tendering the transaction token;

selectively transmitting the transaction information to a transaction information database that stores an account information for an authorized user;

comparing the transmitted transaction information with the account information stored in the transaction information database to determine in real time if the account against which the transaction token is applied is in condition to complete the transaction and to verify that the individual presenting the transaction token is the authorized user;

selectively transmitting the biometric data to a first biometric database that stores biometric information for the authorized user;

comparing the transmitted biometric data with biometric information stored in the first biometric database to determine in real time if the person tendering the transaction token is authorized to use the account against which the transaction token is applied;

transmitting the biometric data to a second biometric database that stores biometric data for a plurality of invalid users;

comparing the transmitted biometric data with the biometric data stored in the second biometric database to determine if the individual presenting the transaction token is an invalid user; and transmitting a result from the comparisons with stored account information and stored biometric data for the authorized user to a transaction location to accept or reject the transaction in real time.

21. The method of claim 20, further including the steps of:

obtaining the signature of the person tendering the transaction token;

selectively transmitting the signature information, either together with or separately from the transaction information and the biometric data, to a signature database that stores signature information for the authorized user;

comparing the transmitted signature information with signature information in the signature database to determine in real time if the signature is that of an authorized user for the account against which the transaction token is applied.

22. The method of claim 20 further including the step of encoding the biometric data on the transaction token.

23. The method of claim 20 further including the step of transmitting data indicative of whether the person is authorized to use the account to the location where the transaction information and biometric data are obtained.

24. An electronic transaction verification system for use with a transaction token processing system, at a location where a transaction token is presented by an authorized user to complete a transaction, comprising:

a reading device for reading the transaction token and transmitting transaction information to the transaction information database;

a first biometric data device for recording and transmitting biometric data that is received with the transaction token;

a second biometric database for storing biometric data for a plurality of invalid users:

a biometric database for storing biometric data for a plurality of authorized users;

a transaction information database for storing account information for an authorized user;

wherein the biometric device selectively transmits biometric data to the first biometric database to verify the identity of the individual presenting the transaction token in real time;

wherein the biometric data is transmitted to the second biometric database to determine if the individual presenting the transaction token is an invalid user;

wherein the reading device selectively transmits the transaction information to the transaction information database to verify the condition of the account to complete the transaction in real time and to verify that the individual presenting the transaction token is the authorized user; and wherein a result from the comparisons with stored account information and stored biometric data for the authorized user is returned to the transaction location to accept or reject the transaction in real time.

25. The electronic transaction verification system for use with a transaction token processing system of claim 24 wherein the transaction information comprises magnetic ink character recognition data that is printed on the negotiable instrument.

26. The electronic transaction verification system for use with a transaction token processing system of claim 24 wherein the biometric data device digitizes a representation of the biometric data received with the transaction information and encodes the digitized biometric data directly on the transaction token.

27. The electronic transaction verification system for use with a transaction token processing system of claim 24 further comprising:

a scanning device for scanning signature data received with the negotiable instrument;

a signature database for storing signature data for the authorized user;

wherein the scanning device selectively transmits signature data to the signature database to determine in real time if the signature data was received from the authorized user.

28. A method for real time electronic verification and authorization of a transaction in which a token is presented to complete the transaction, comprising the steps of:

receiving transaction information from the token;

receiving biometric data from an individual who presented the token for payment;

comparing the received transaction information with account information stored for an authorized user to determine if the account is in a satisfactory condition to complete the transaction and to verify that the individual presenting the transaction token is the authorized user;

comparing the received biometric data with biometric data stored for the authorized user to verify the identity of the individual presenting the token;

comparing the received biometric data with biometric data stored for a plurality of invalid users to determine if the individual presenting the token is an invalid use; and authorizing the electronic transaction in real time if the account is in satisfactory condition and the identity of the individual is verified as the authorized user.

29. The method of claim 28 wherein the token comprises at least one of a check, a substitute check, a credit card, a debit card, a smart card, a promissory note, a traveler's check and a food stamp.

30. The method of claim 28 wherein the biometric data comprises at least one of a fingerprint scan, a retinal scan, an iris scan, a voice print, a hand geometry scan and a facial scan.

31. A method for real time electronic verification and authorization of a transaction in which a token is presented to complete the transaction, comprising the steps of:

receiving transaction information from the token;

receiving biometric data from an individual who presented the token for payment;

comparing the received transaction information with account information stored for an authorized user to determine if the account is in a satisfactory condition to complete the transaction;

comparing the received biometric data with biometric data stored for the authorized user to verify the identity of the individual presenting the token;

comparing the received biometric data with biometric data stored for a plurality of invalid users to determine if the individual presenting the token is an invalid user; and rejecting the electronic transaction in real time if either the account is not in satisfactory condition or the individual is determined to be an invalid user.

32. The method of claim 31 wherein the token comprises at least one of a check, a substitute check, a credit card, a debit card, a smart card, a promissory note, a traveler's check and a food stamp.

33. The method of claim 31 wherein the biometric data comprises at least one of a fingerprint scan, a retinal scan, an iris scan, a voice print, a hand geometry scan and a facial scan.

* * * * *